United States Patent [19]

Lucas et al.

[11] Patent Number: 6,075,530

[45] Date of Patent: Jun. 13, 2000

[54] COMPUTER SYSTEM AND METHOD FOR ANALYZING INFORMATION USING ONE OR MORE VISUALIZATION FRAMES

[75] Inventors: Peter Lucas; Steven Roth; Jeffrey Senn; Michael Blaine Burks; Philip Stroffolino, all of Pittsburgh, Pa.

[73] Assignee: Maya Design Group, Pittsburg, Pa.

[21] Appl. No.: 08/832,523

[22] Filed: Apr. 17, 1997

[51] Int. Cl.[7] ............................................. G06F 3/14
[52] U.S. Cl. ............................................ 345/339; 345/346
[58] Field of Search .................................... 345/339, 348, 345/352, 353, 356, 357, 346, 349, 968, 433, 440; 707/3, 4, 5

[56] References Cited

U.S. PATENT DOCUMENTS

| | | | |
|---|---|---|---|
| 5,572,644 | 11/1996 | Liaw et al. | 345/326 X |
| 5,581,670 | 12/1996 | Bier et al. | 345/326 |
| 5,617,114 | 4/1997 | Bier et al. | 345/113 |
| 5,644,692 | 7/1997 | Eick | 345/326 |
| 5,652,851 | 7/1997 | Stone et al. | 345/346 |
| 5,710,899 | 1/1998 | Eick | 345/339 |
| 5,721,903 | 2/1998 | Anand et al. | 707/5 |
| 5,729,704 | 3/1998 | Stone et al. | 345/346 |

OTHER PUBLICATIONS

Myers, Brad A. et al., "Creating Charts by Demonstration," Proceedings of the Conference on Human Factors in Computing Systems—SIGCHI '94, pp. 106–111 (1994).

Eick, Stephen G. et al., "Navigating Large Networks with Hierarchies," Proceedings of the Conference on Visualization '93, pp. 204–210 and CP-20 (1993).

Casner, Stephen M., "A Task–Analytic Approach to the Automated Design of Graphic Presentations," ACM Transactions on Graphics, vol. 10, No. 2, pp. 111–151 (Apr. 1991).

McDonald, John Alan et al., "Painting Multiple Views of Complex Objects," ECOOP/OOPSLA '90 Proceedings, pp. 245–257 (1990).

Roth, Steven F. et al., "Data Characterization for Intelligent Graphics Presentation," Proceedings of the Conference on Human Factors in Computing Systems—SIGCHI '90, pp. 193–200 (1990).

Becker, Richard A. et al., "Brushing Scatterplots," Techometrics, vol. 29, No. 2,pp. 127–142 (May 1987).

Mackinglay, Jock, "Automating the Design of Graphical Presentation of Relational Information," ACM Transactions on Graphics, vol. 5, No. 2, pp. 110–141 (Apr. 1986).

*Primary Examiner*—Crescelle N. dela Torre
*Attorney, Agent, or Firm*—Morgan, Lewis & Bockius LLP

[57] ABSTRACT

A computer program, which is a user interface for exploring and analyzing information in a plurality of analysis environments, comprises the steps of receiving information to be analyzed, generating data objects, each of which has a plurality of associated attributes, creating a first visualization frame that has a plurality of first elements. The first visualization frame is created by arranging each of the data objects according to at least one of its plurality of attributes, and the attributes remain associated with the respective data objects. The final step creates at least one second visualization frame by manipulating individual first elements of the first visualization frame according to a second one of the plurality of attributes and arranging the data objects according to a second one of the plurality of attributes. The attributes remain associated with the respective data objects.

29 Claims, 10 Drawing Sheets

COMPUTER SYSTEM AND METHOD FOR ANALYZING INFORMATION USING ONE OR MORE VISUALIZATION FRAMES

The U.S. Government has a paid-up license in this invention and the right in limited circumstances to require the patent owner to license others on reasonable terms as provided for by the terms of contract number DAAM01-94-C-0029 awarded by the U.S. Army.

BACKGROUND OF THE INVENTION

1. Field of the Invention

The present invention relates to a program implemented on a computer, and more particularly, to a user interface for exploring and analyzing information.

2. Discussion of the Related Art

Information processing analysis has become increasingly important. Also, information processing has become part of almost every work environment. Moreover, the amount of data collected and the complexity of the desired analyses of that collected data are continuously growing. Accordingly, the tools for such analyses have become highly specialized, requiring considerable knowledge of the operational details, search languages, and mathematical theory. As a result, the available tools are difficult to use and provide very limited functionality. Historically, only highly trained individuals had the skill to use analysis and visualization tools.

Information systems, such as decision support systems, databases, and statistical analysis tools typically process and generate large amounts of data to be examined and acted upon by analysts, managers, and technicians. Because of the diversity of information in these systems, it is very difficult to create a customized human/computer interface that enables users to examine data effectively. Each situation presents a unique problem-solving goal that requires an interface to be customized for a specific type of information and for a particular method of searching, analyzing, and combining the information.

While system developers often devote substantial resources to implementing display programs to express information, the resulting display capabilities are typically inadequate. For example, the display capabilities are usually narrow in purpose, difficult to transfer to new applications, and inflexible in user interaction. Also, developers of information systems often do not have expert graphics or interface development knowledge, thereby resulting in poorly designed displays despite considerable development effort.

This problem is pervasive throughout a variety of environments such as government, industry and academic research institutions. As computer resources become more powerful and readily available, new systems are being created to store and make use of large quantities of information. In many areas, effort is being focused on the development of enhanced decision-making tools (e.g., logistics and distribution planning, scheduling, and tracking). In some industries, up to an estimated 40% of the development effort in these systems will be devoted to interface issues. Accordingly, new electronic abilities are needed for people who must examine large quantities of diverse data.

A software tool for the creation of information displays and interfaces will be significantly enhanced by the ability to create information presentations using diverse and customizable graphical techniques with flexibility for integrating many combinations of unique techniques. Some examples of such presentations are techniques to create interactive displays that enable users to examine, search and explore data at many levels of abstraction, as well as to perform manipulation tasks (e.g. database updates); assist in the design of information displays and interfaces by providing computerized knowledge of information characteristics, information analysis and graphic design; simplify the task of specifying an information display by providing a mechanism for expressing characteristics of information to be visualized as well as the function that a display will serve; automate many aspects of display design while preserving the ability of system developers and end-users to control and modify the display design decisions; and provide these capabilities across many different application domains.

Currently, only presentation graphics packages, such as stand-alone packages or components of other popular commercial software, special-purpose charting and graphing packages, and user interface building toolkits can be used for the above noted needs. However, these products do not fully address the above requirements for a variety of reasons.

First, there is no computerized knowledge of the display design. Accordingly, existing systems cannot assume any of the burden from developers in making design decisions and generating novel displays. Also, existing systems cannot freely integrate graphical techniques from their libraries to customize displays for combinations of many different types of information.

Second, there is no easy mechanism for specifying user needs. Existing presentation graphics systems provide lengthy menus of graphical styles, but no mechanism for users to easily specify their needs.

Third, existing products offer few interactive capabilities. Commercial graphics packages are just beginning to provide interactive capabilities, as opposed to static presentations. These interactive packages are limited to simple interface functions for predefined display types. For example, a graphics package may provide bar chart displays in which users can select individual bars with a computer mouse to view the portion of a spreadsheet from which the bar was derived or manipulate the length of a bar to modify spreadsheet values. However, no capabilities for searching many levels of data using different types of display at each level are possible.

Fourth, graphics packages offer no flexibility for complex combinations of data. The packages typically provide many simple displays. Some packages may provide display styles for conveying complex combinations of data; however, they are not modifiable for new, unanticipated combinations of data. This is a serious problem for applications that depend on complex data requiring many combinations of temporal, spatial, and other quantitative information.

Fifth, current interface toolkits offer limited information presentation capabilities. In fact, interface style definitions like Motif within the X environment have not addressed the need for standards for information presentation graphics and provide little support other than primitive drawing capabilities. As a result, while there are many efforts to develop X-based interface building toolkits and other efforts to provide PC-level presentation graphics, there has been no attempt to integrate the two.

SUMMARY OF THE INVENTION

Accordingly, the present invention is directed to a computer system that substantially obviates one or more of the problems due to the limitations and disadvantages of the related art.

An object of the present invention is to provide a computer system having dynamic visualization generation, thereby allowing integrative views of information and rapid generation of visualizations customized to a user's immediate data exploration tasks.

Another object of the present invention is to provide a computer system having interactive information manipulation.

A further object of the present invention is to provide a computer system having a consistent information-centric user interface paradigm.

Yet another object of the present invention is to provide a unique data navigation method using drill-down and roll-up techniques for navigating multi-dimensional data.

Another object of the present invention is to provide an intelligent tool for dynamic generation of visualizations.

A further object of the present invention is to provide a fully integrated presentation and briefing environment.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the computer assisted method for analyzing information in a plurality of analysis environments comprises the steps of receiving the information to be analyzed; generating data objects, each data object having a plurality of associated attributes; creating a first visualization frame having a plurality of first elements, by arranging each of the data objects according to at least one of its plurality of attributes, wherein the attributes remain associated with the respective data objects; and creating at least one second visualization frame having a plurality of second elements, by manipulating individual first elements of the first visualization frame according to a second one of the plurality of attributes and arranging the data objects according to a second one of the plurality of attributes, wherein the attributes remain associated with the respective data objects.

According to another embodiment of the present invention, the computer system for providing visualized analysis of information in a plurality of analysis environments comprises means for receiving information to be analyzed; means for processing the information received; and means for displaying the information in at least one visualization frame, wherein the information is organized into data objects with associated attributes, wherein the data objects are organized and displayed as elements in the at least one visualization frame, each of the elements being persistent such that the elements can be further manipulated.

According to another embodiment of the present invention, a computer assisted method for analyzing information in a plurality of analysis environments comprises the steps of receiving the information to be analyzed; generating data objects, each data object having a plurality of associated attributes; and creating at least one visualization frame having a plurality of elements, by arranging each of the data objects according to at least one of its plurality of attributes, wherein the attributes remain associated with the respective data objects.

It is to be understood that both the foregoing general description and the following detailed description are exemplary and explanatory and are intended to provided further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present invention has a user interface paradigm that takes an aggressively information-centric approach to the presentation of information to the user. The information-centric approach may be thought of as the next logical step beyond the path from application-centric architectures to the modern document-centric approach. The distinctions among the three approaches hinges on differences in the "basic currency" through which the user interacts with the system.

In application-centric architectures, the file is the basic currency. The file system is completely exposed to the user and a somewhat detailed understanding of its workings is a prerequisite to the productive use of the system. Although individual files in the file system are the basic unit of information, the files themselves are of little use to the user. To access the information in the files, the user must rely on "applications" to fetch and display the information from the files. In this manner, applications are like remote manipulator arms in nuclear power plants where a user is not allowed to "touch" the data, except indirectly via various special-purpose tools. Each application has a user interface that strictly defines what kinds of files people can manipulate and what can be done with the files.

With the introduction of graphical user interfaces and the desktop metaphor, files have become concrete visual objects, directly manipulable by the user, storable on the desktop or in folders, and, to a limited extent, arrangeable by a user and software in semantically meaningful ways. However, the contents of files are still out of direct reach of the user.

The advent of document-centric interface paradigms has introduced many positive changes into data handling. Here, the basic currency is not the file, but rather the document— an entity with some potential meaning in the user's world outside the computer. The role of the application is subordinated, and perhaps ultimately eliminated, in favor of component architectures whose interactions with the user are focused on direct manipulations of documents. Documents (as well as files) may be kept on the desktop and may be directly activated and manipulated via drag-and-drop operations. Documents may serve as containers for other documents, enabling natural modes of grouping and attaching information together in meaningful units. Some extremely document-centric interfaces, for example Workscape, permit the spatial arrangement of large numbers of documents, and enable effective visualizations of the relationships among documents. The application of dynamic query techniques in a document-centric world enables visual search paradigms. In document-centric interfaces, users can almost literally "get their hands on" their documents.

The information-centric approach represented in the present invention abandons the primacy of the document wrapper as the central focus of user interaction in favor of the data element as the basic currency of the interface. Rather than limiting the user to files and documents as the target of direct manipulation, the present invention permits direct drag-and-drop manipulation of data at any level of granularity. A numeric entry in a table, selected bars from a bar chart, and a complex presentation graphic are all available for user manipulation, and all follow the same interface "physics."

Figure 1:
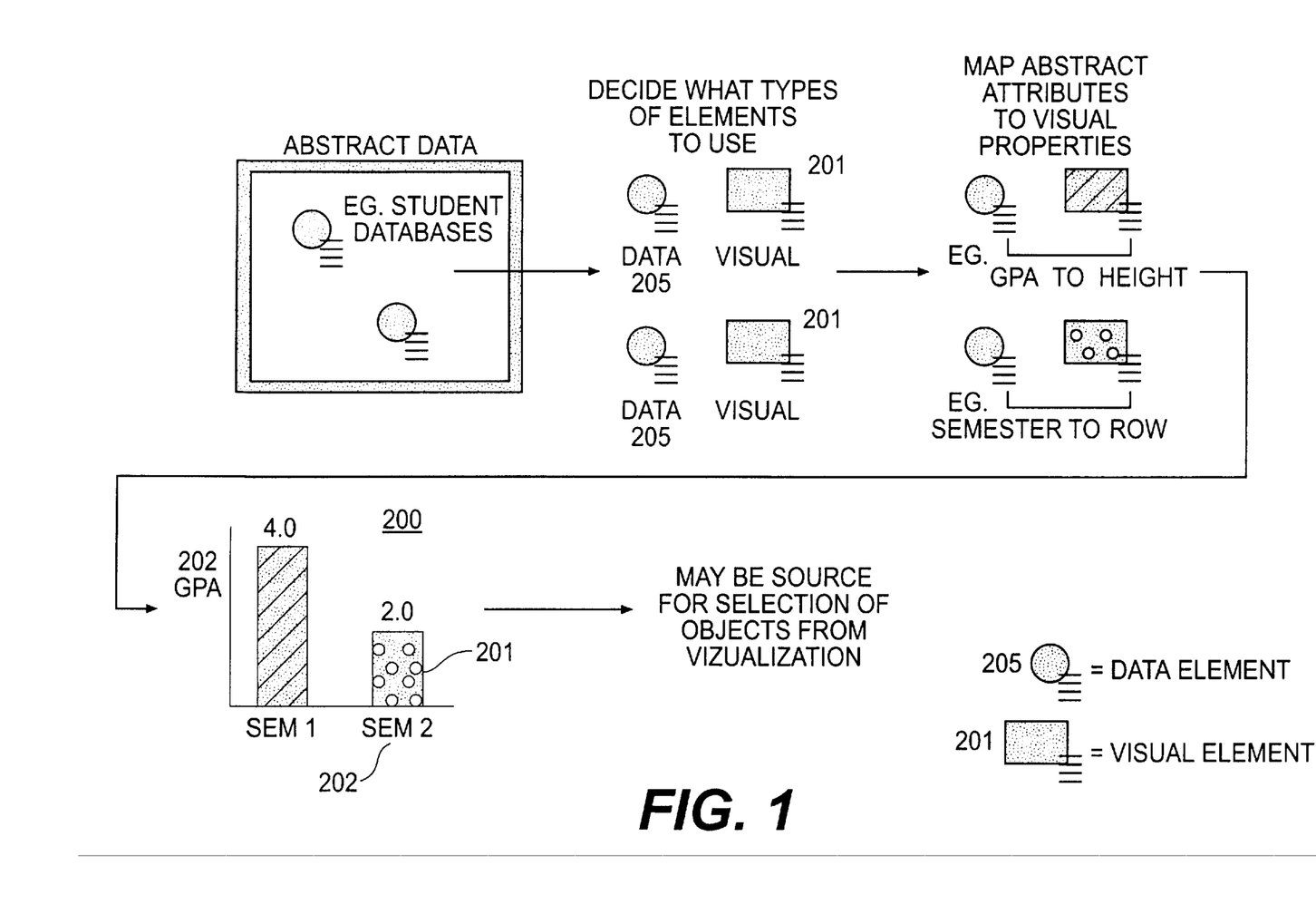
FIG. 1 is a diagram illustrating a visualization construction in the present invention.

The interface environment of the present invention strives to minimize the number of fundamental types of objects that must be understood by the user. The operations of the interface environment are shown in FIG. 1. As a first approximation, the present invention may be considered as having only two basic object types: elements and frames.

In accordance with the present invention, the term elements, more properly called "visual elements," refers to any atomically-manipulable data object in a display. Examples of visual elements are shown in FIG. 1 as bars 201 in a bar chart 200 or the text label of an axis 202. Other examples are a point in a scatter chart, or a numeric value in a spreadsheet cell. Each visual element corresponds to an object in an underlying database. Note that this relationship is one-to-many in that each element is associated with exactly one database object, but the same object may be represented by multiple elements. Some elements are atomic, but others are compound multiple elements bound together into a single entity. An example of the latter might be a dot representing a city on a map, a text label naming the city, and a gauge telling its population.

In a literal sense, all displays of the present invention are made up of collections of elements arranged to form the display. For example, the bar chart 200 in FIG. 1 is not a discrete "picture", but rather an arrangement of elements 201 and 202 that can be broken apart by the user and separately manipulated. As the illustration shows, this makes it easy for the user to select some bars from the display (either removing them or duplicating them) and drag them to another display. The ability to directly drag small units of data, which forms the basis of the information-centric approach to interface design, will be described later.

A few existing interfaces have very primitive and special purpose drag and drop features. For example, some word processing packages enable the user to drag selected text from one place in the document to another place, thus bypassing the often-criticized invisible clipboard as a mechanism for moving data around within an application. The present invention, however, relates to a ubiquitously available capability that can be used everywhere in the environment. The information-centric approach of the present invention becomes part of the "basic physics" of the interface, thereby empowering the user to directly perform unique actions that might otherwise require knowledge of numerous specialized interface features.

Frames, the second basic object type of the present invention, serve as pasteboards for elements. For example, the bar chart 200 of FIG. 1 is displayed within a frame. Strictly speaking, frames are themselves elements, but are sufficiently distinct in the user's model of the interface as to warrant separate treatment. Like windows in traditional GUI designs, frames provide a grouping function for related elements as well as a frame of reference for their arrangement. Unlike windows, however, frames are lightweight objects, easily created and destroyed, frequently manipulated by the user, and are themselves subject to the entire repertoire (duplication, drag-and-drop, dynamic scaling, etc) of direct-manipulation actions available for other elements.

Another major function of frames is as anchor points for scripts, thereby providing a highly scripted interface. Beyond the processing of basic user events, such as a mouse-dragging and clicking, nearly all the high-level behavior of the system is controlled by user-accessible scripts rather than hard-coded methods. Although scripts may be attached to any element, most of the scripts of a typical interface are associated with frames. In FIG. 1, for example, it is the script of the "Bar Chart" frame 200 that causes data 205 dropped on that frame to be displayed as horizontal bars of certain lengths and locations. Similarly, scripts of a map frame cause the same data to be displayed as icons arranged by latitude and longitude. In this way, scripted frames may be composed to form highly customized applications environments, tailored to a particular user's needs.

The scripting environment provides another essential feature in support of the data exploration operations of the present invention. Although the underlying database being explored may have many data values directly given, many other such values typically need to be derived in a very situation-specific application manner. For instance, in a transportation scheduling application, the database may contain attributes of a commodity such as gross weight and package weight. The user, however, may require a display of net shipping weight, which is not directly given. The present invention allows the definition of scripts which compute "derived attributes" of such computed data. Once defined, such scripts make available to the user data units which are indistinguishable from those directly given in the database. A script will access database information to calculate and form a new attribute.

Finally, scripting is the basis for delivering to the user the drill-down and roll-up data navigation features which will be described later. For example, a logistics application would support a "regrouping" operation which, in a single step, breaks down a supplied unit into a long list of its required inventory items and then recomposes the unit by the supply points that provides the items. Such operations form the basis for very powerful incremental data navigation and summarization that would require hopelessly complex queries in conventional database systems.

Collections of purpose-built frames are typically gathered together to form a coherent, highly-tailored work environment. Such environments may be augmented by scripted behaviors that add useful global features to the environment at large. For example, elements are globally coordinated across all frames of the interface, thus greatly enhancing the user's ability to identify related information across displays. Similarly, dynamic query tools are included in the environment, permitting the interactive control of the visual attributes of the elements of the display according to parametric aspects of the database. With the present invention, users may use sliders to select a subset of objects in a display and then drag the subset to other displays to focus on different attributes. Creating special purpose user interfaces in the environment provides custom functionality, but still retains general features. Thus, a specialized interface still displays objects that can be dragged to other more general displays.

Frames and their contents may be freely scaled, either by direct manipulation or by script. A given frame may be shrunk to thumbnail size for temporary storage, or expanded to full-screen during a presentation. This capability enables the efficient and flexible usage of the available display screen space.

As a result of the information-centric approach of the present invention, the data elements and frames can be used to provide at least several advantages that will now be explained.

Figure 5:
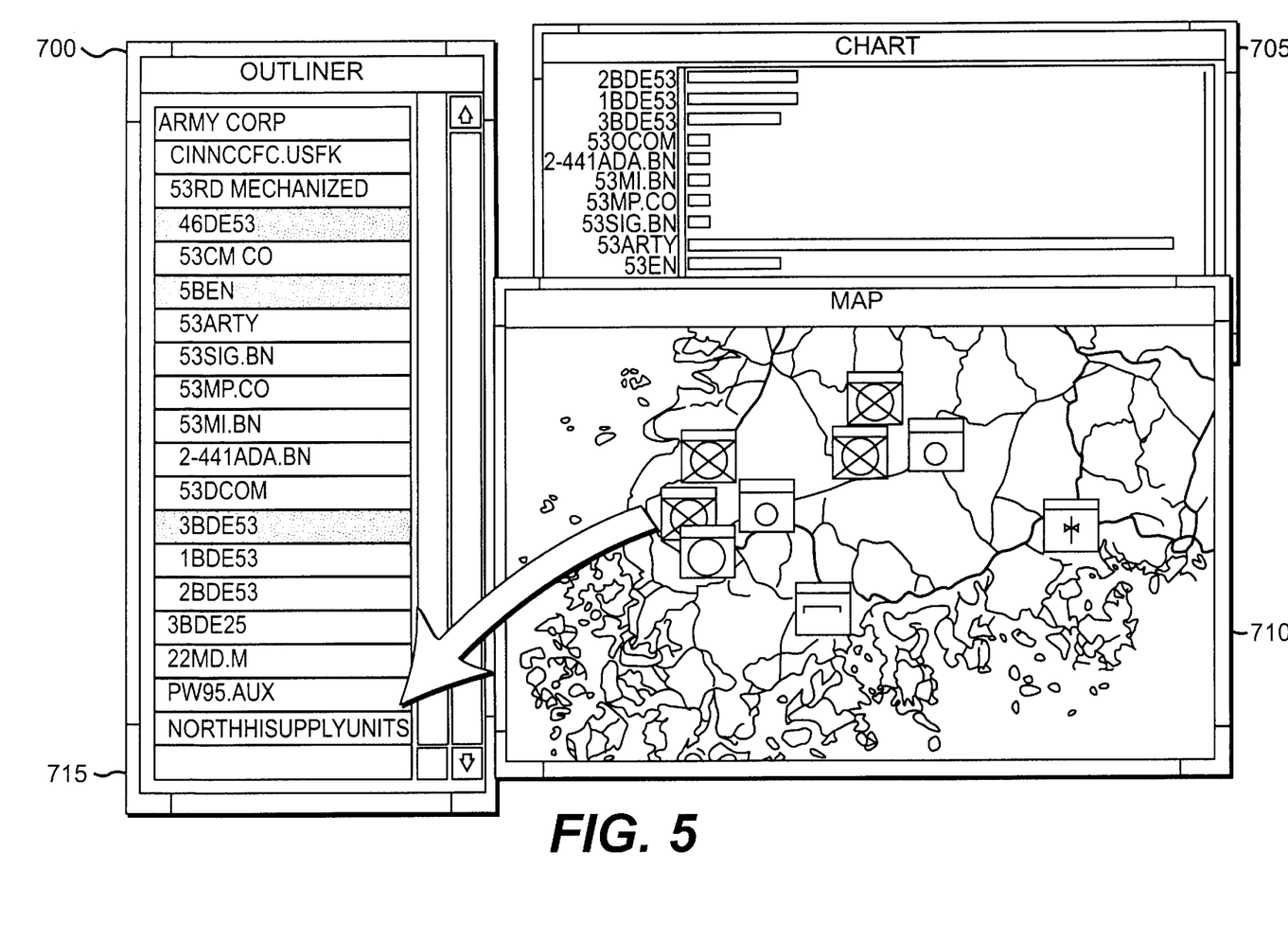
FIG. 5 illustrates a resulting display from roll-up of units according to the present invention.

Starting from any point in a data network users may access a menu of alternative dimensions along which they may navigate. First, the user can choose to "drill-down" along any of the data dimensions by selecting any of the relations from the menu, thereby resulting in a more detailed organizational breakdown. This drill-down process is available across different relations. As shown in FIG. 5, for instance, it is possible for a user to drill-down an outliner 700 to get a division, drill-down from the division to get a list of the equipment it possesses, then drill-down from one type of equipment to the parts or supplies it requires, and then drill-down to all the supply points where the parts are available. This is a process of turning a network or web of relations into multiple hierarchies for navigational purposes. Users can select any attribute of the objects in the hierarchy that they want to have displayed, such as the quantity of supplies a unit requires, its echelon, or the number of people in the unit. As the hierarchy is expanded, the data attributes also are expanded. The dynamic drill-down and expression of attribute values is an advantageous operation of the present invention that may be available in every display. That is, drill-down can occur as easily in a bar-chart 705 or on a map 710 as on an outliner 700.

The complement to the data navigation technique of drill-down is "roll-up." Subsets of units can be rolled-up (i.e., aggregated) into a single object and named by the user. The new aggregate is then treated as a single object, which may be drilled-down to show other units, their support, inventory or other information. This approach enables users to compose a complex query through a series of drill-down, drag, select and roll-up operations. With the present invention very complex queries may be conducted entirely by direct manipulation.

Another operation in the information-centric interface according to the present invention is the direct drag-and-drop movement of information throughout the environment. Objects representing information are moved directly in groups or individually among visualization and application interfaces via simple drag-and-drop operations. For example, to display graphically some of the attributes of the units in the logistics supply example, one simply drags the unit names from the outliner to an empty bar chart display. Then, particular bars of the bar chart may be transferred to a mapping application using the same drag-and-drop operation. Displaying the information in various forms facilitates visualization of the solution. Particular flexibility is gained by allowing the user to manipulate any object within any display.

Another technique used in the user interface environment according to the present invention improves data exploration and analysis by selecting or highlighting data. In a preferred embodiment, this is performed by color highlighting or painting the data. When highlighting a subset of the data in one frame, multiple displays may be visually coordinated. That is, highlighting an object in one display causes a corresponding highlighting in all other displays. Together, all the displays have highlighted the selected data and desired attributes.

The environment according to the present invention provides simple briefing or "slide show" ability. As analyses are performed, text and graphics are captured and saved in special frames called "slides." A slide is simply a frame with special scripts to easily "paste up" other frames and elements for visual presentations. The user simply drags-and-drops the desired displays on to the slide frame where they are sealed appropriately. Elements on the slide frame do not lose their separate identity. They are still fully-functional interface objects that can be dragged back off of the slide frame and used for further analysis. The objects can be dragged even in the middle of a briefing.

Collections of frames are accumulated in a "slide sorter" frame having special scripts to easily sequence a presentation by simple drag-and-drop operations, similar to presentation packages such as Powerpoint. Other scripts in the slide sorter support the sequential display of each slide at full-screen size. Thus, the briefing function is seamlessly integrated with those of data exploration and analysis.

A detailed example will now be explained to further convey the basic interactions used in accordance with the present invention. The foregoing example is based an application which facilitates logistics tracking and planning, wherein it is desirable to access and analyze information about the location, quantities, status, transportation, distribution, consumption and other properties of supplies, equipment and consumers.

Figure 2:
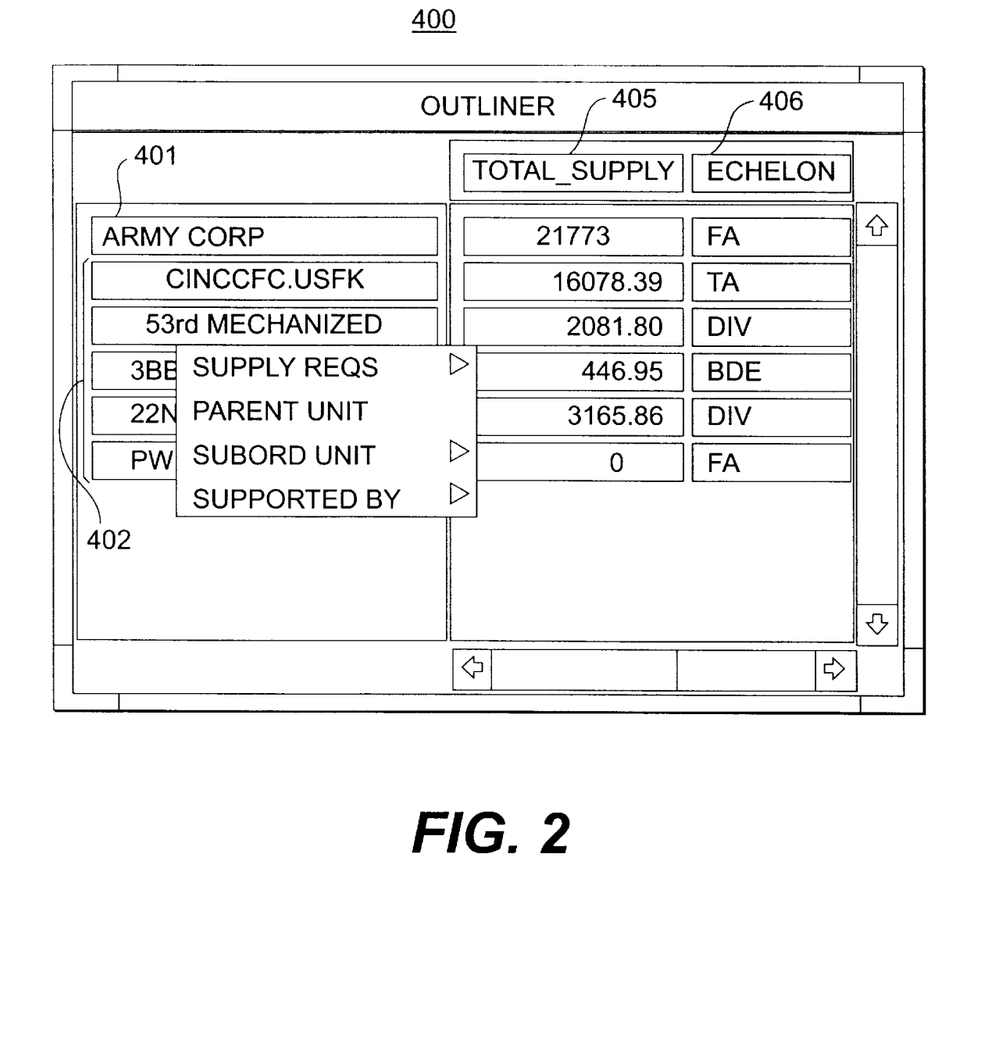
FIG. 2 illustrates an outliner and drill-down display according to the present invention.
Figure 3:
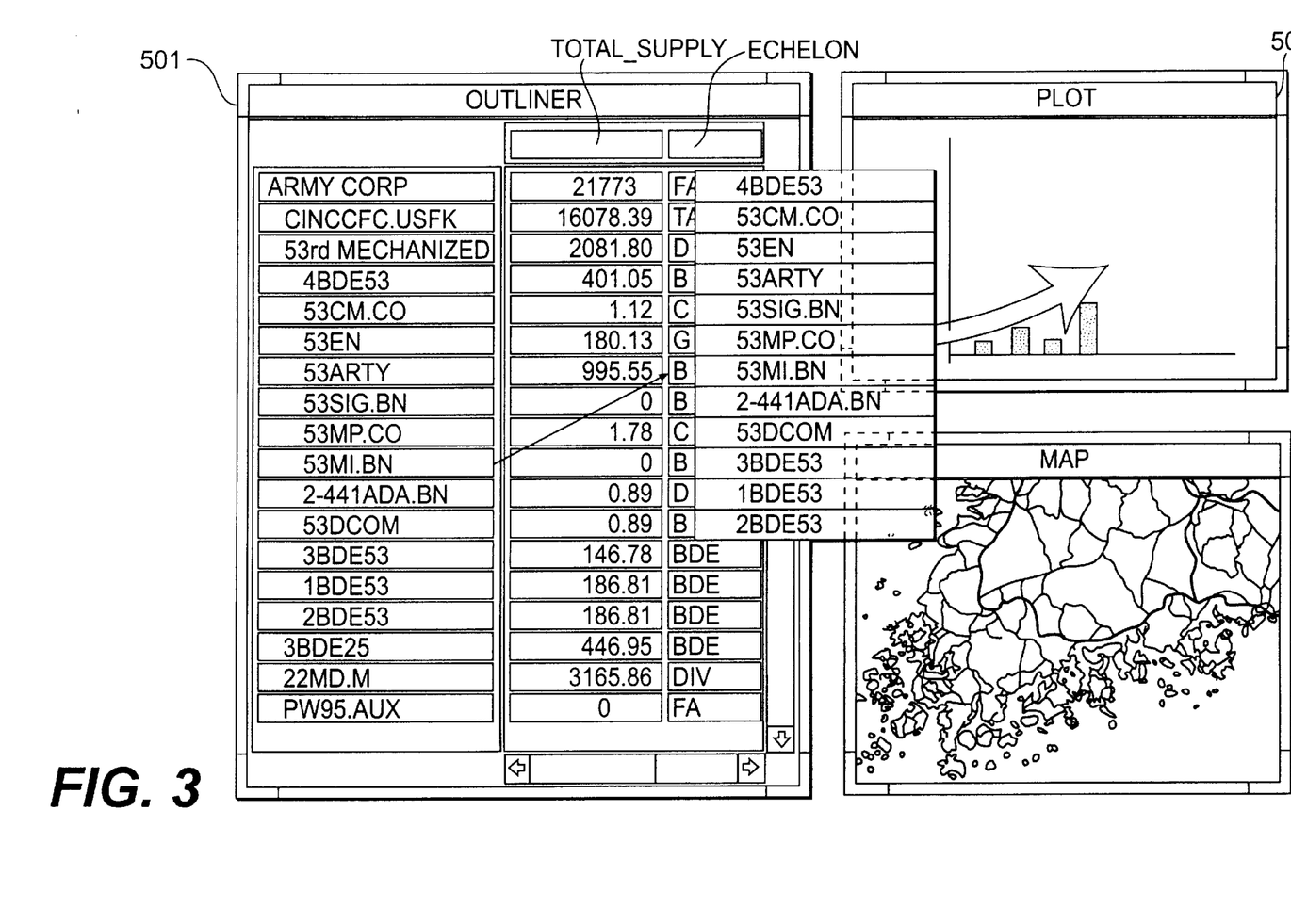
FIG. 3 illustrates a resulting display from drill-down of an outliner, bar chart and map according to the present invention.

FIGS. 2 and 3 contain an outliner or an hierarchial style of table that is one of many displays that can be produced in the environment in accordance with the present invention. It is one way to provide a hierarchial perspective on tabular data and is useful for this example because it illustrates drill-down and roll-up capabilities in a familiar way. The same techniques are applicable to other approaches of displaying hierarchial data.

Starting from any point in an object-oriented database for a logistics exercise, a user is offered a menu of alternative dimensions along which they may drill-down. FIG. 2 illustrates an outliner 400 in which the user has already drilled-down from an object representing an Army 401 to its five subordinate units 402, and has selected one division (53rd Mechanized) to organizationally drill-down further. This occurs by selecting the subordinate unit relation from the pop-up menu that is dynamically attached to the 53rd Mechanized Division. The result is a more detailed organizational breakdown shown in FIG. 3.

This drill-down process also could occur across different relations or links from any of these objects. For example, it is possible to drill-down from an object representing an Army unit to the equipment it possesses (e.g. trucks, generators, stoves), then from one type of equipment to the parts or supplies it requires (e.g. from truck to truck parts), and then to all the warehouses that contain each part. This is a process of turning a network or web of database objects into a convenient hierarchial breakdown for analysis purposes.

On the right side of the outliner 400 in FIG. 2, users can select any attribute of the objects in the hierarchy to be displayed, such as the weight of supplies a unit requires 405 or the echelon giving the number of people in the unit 406. These attributes can be among those stored directly in the database or dynamically derived attributes using a script. In either case, as the hierarchy is expanded, the values for these attributes are added with it. The dynamic drill-down and expression of attributed values is a fundamental operation of the present invention that can occur in kind of display frame. In the example shown in FIG. 2, a user has drilled-down just organizationally to a particular group of units.

An important operation in the implementation of the information-centric interface approach is the ability to drag information throughout the environment of the present invention. Objects representing information are moved directly in groups or individually among visualization and application interfaces. As shown in FIG. 3, in order to display some of the attributes of these units graphically, one simply drags a copy of the unit names from the outliner 501 to an empty bar chart display 505. The subordinate units of the 53rd Mechanized Division are dragged as a group from the outliner into the empty bar chart display shown in FIG. 3.

Figure 4:
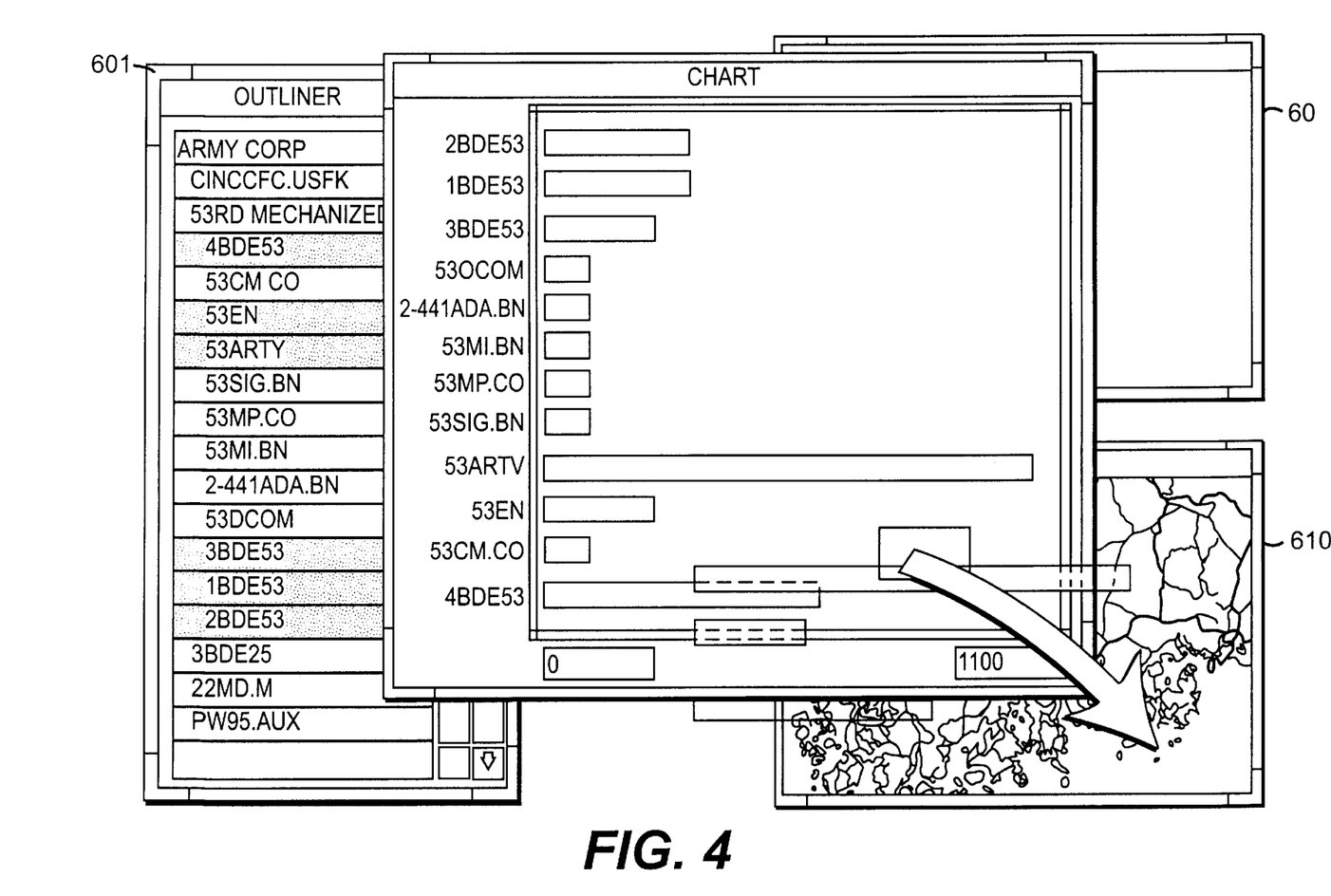
FIG. 4 illustrates a resulting display from drill-down of an outliner, bar chart and map according to the present invention.

In FIG. 4, a bar chart 605 shows, as bars, the weight of supplies that these units require. Each display shows some attributes by default, can be customized to display attributes by default, or can be customized to display attributes interactively by selecting from a menu like the one used for the attributes in the outliner 601. The menu of attributes that can be displayed is constructed dynamically from all the attributes associated with the objects that are dropped into the display.

Focusing in FIG. 4 on the units with highest supply weights provides an opportunity to display the locations of just these units on a map, perhaps to determine the locations where supply warehouses should be established. Units are transferred to a mapping application 610 using a similar drag-and-drop operation shown in FIG. 4. By default, a map display shows the longitude and attitude attributes of objects and uses symbols associated with unique identifiers of units and other objects.

Again, the map display can be used to further focus attention, for example, by color highlighting the subset of units that occur close together in the center of the map, for example to identify a region where large quantities of supplies will be needed. In the preferred embodiment, color highlighting an object in one display causes it to be similarly colored in all other displays. Together, the three displays in FIG. 5 show which units are selected in the outliner 700, how many supplies the units need in bar-chart 705, and where the supplies are located in map 710.

Finally, a subset of units can be rolled-up, or aggregated, into a single object and named by a user. Shown in FIG. 5, the rolled-up object 715 has been named "Hi Supply Units." It appears in the bottom of the outliner 700 and its attributes are the appropriate totals of the those for the units it aggregates. The new aggregate can be treated as a single object for new drill-down operations. For example, it is possible to drill-down into this aggregate along a new dimension, for example, the supply types that the aggregated units need.

In summary, the information-centric properties of the present invention are directly applied to physical objects representing information rather than through the mechanics performed by separate applications. For example, bar chart and mapping programs are invoked by moving objects to displays rather than by running programs and performing export/import procedures. The coordination and partitioning of information in multiple displays occurs via color highlighting operations applied directly to objects linked to a common underlying database. Similarly, drill-down and roll-up operations are performed directly in any display through a shared object representation, including links between objects and object containment. That is, objects can be combined and replaced by an aggregate to perform roll-up functions. The structure of the present invention also enables users to compose complex queries using a series of drill-down, roll-up, drag, and highlighting operations.

The present invention may be built using a scriptable GUI building system. The general operation of the present of the present invention will now be explained with reference to FIGS. 6 to 10.

Figure 6:
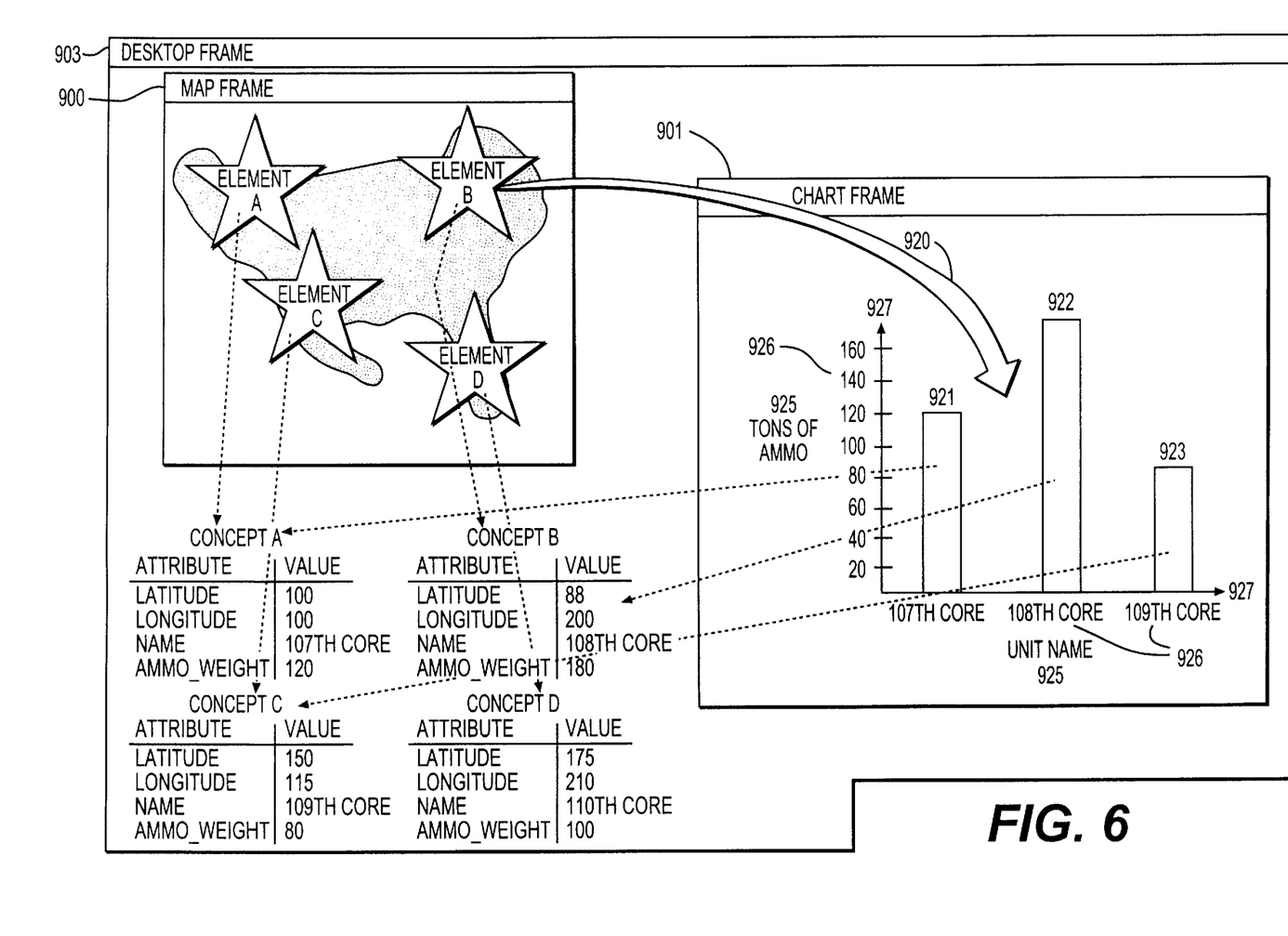
FIG. 6 illustrates a conceptual diagram showing a drag operation according to the present invention.
Figure 7:
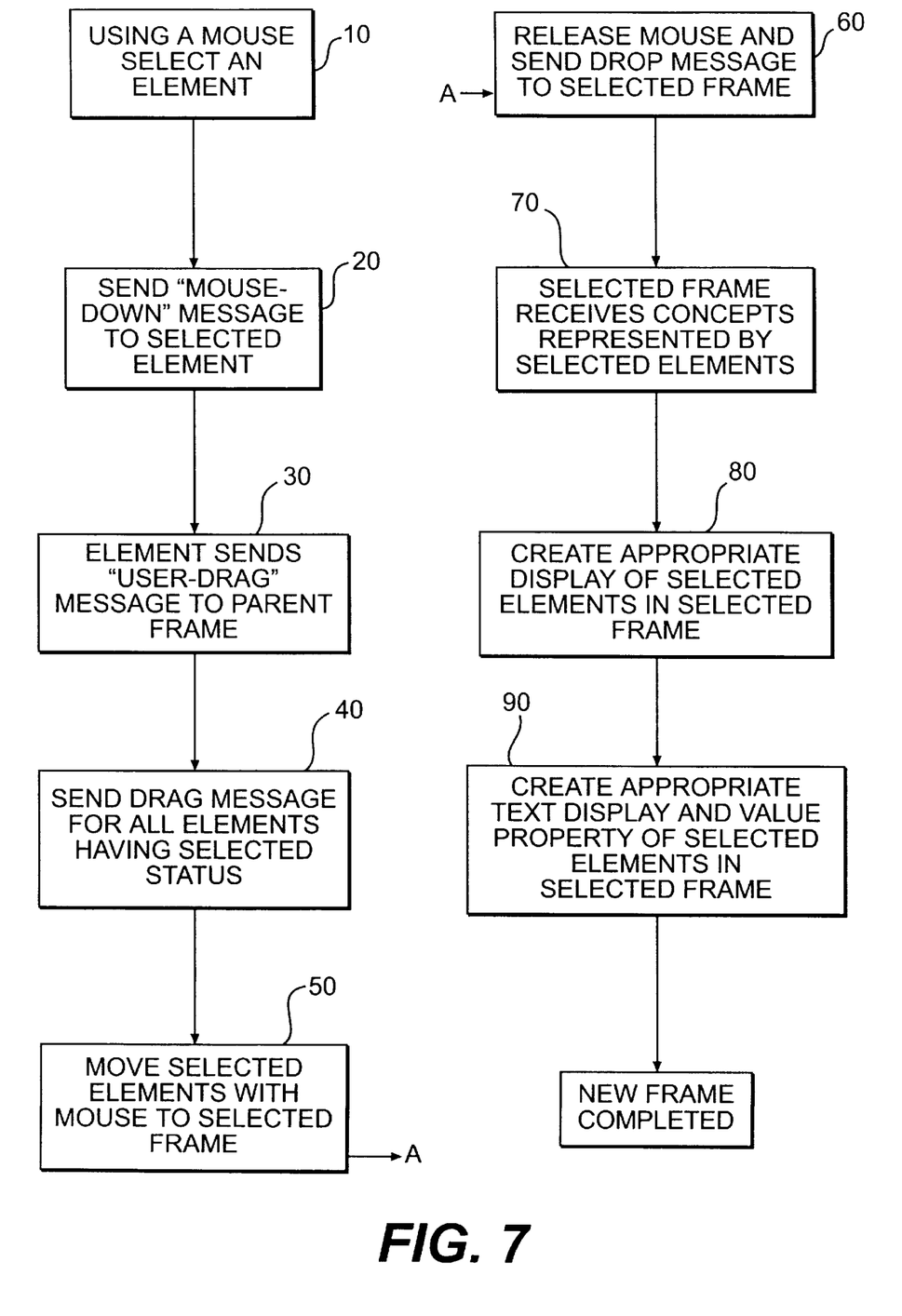
FIG. 7 is a flow chart illustrating the steps shown in FIG. 6.

As shown in FIG. 6 and the flow chart in FIG. 7, elements of a map frame 900 are selected and dragged to a chart frame 901. To accomplish this, in step 10 of FIG. 7, the user selects an element using, for example, a mouse button. Other methods of selecting an element will be apparent to those skilled in the art. In response, the system sends a "mouse-down" message to the element under the mouse cursor (step 20). For example, if element A in FIG. 6 is desired, the user positions the mouse cursor over element A and clicks.

In response to the mouse-down message, the selected element sends a "user-drag" message to its parent frame (step 30 in FIG. 7) expressing the user's interest in dragging it. Here, the parent frame is the map frame 900.

In response to the user drag message, the map frame 900 sends a "drag" message to the desktop frame 903 (step 40 in FIG. 7) with all elements having the same selection status as the selected element. In this case, elements B and C were selected in addition to element A.

In response to the drag message, the desk top frame 900 moves the selected elements under the mouse cursor until the user releases the mouse button, shown as step 50 in FIG. 7. Once the mouse button is released, the desk top frame sends a "drop" message to the frame under the mouse cursor with the dropped elements. Step 60 in FIG. 7. In this case the frame is the chart frame 901.

In response to the drop message, the chart frame 901 receives the concepts that the dropped elements visually represent (step 70). The chart frame 901 recreates a rectangular bar element for each of these concepts as 921, 922, and 923, respectively. The high property of each bar is set proportionally to the appropriate quantities. This is shown as step 80 in FIG. 7. Next, the chart frame 901 creates a text element on each axis for each of the concepts, and sets the value property of each text element to the corresponding attribute of the underlying concept. Finally, the chart frame 901 creates two axis elements 927, a plurality of tick mark elements 926, and two axis-label elements 925, and arranges the bar and label elements along the horizontal axis of the chart setting the appropriate horizontal and vertical axis properties (step 90 in FIG. 7).

The resulting bars in the chart frames are then objects themselves which may be fully manipulated by any desired operation such as drill-down, roll-up, or drag-and-drop operations. Because each of these bars in the resulting frame are themselves objects, the resulting analysis allows a much greater degree of flexibility for the user.

Figure 8:
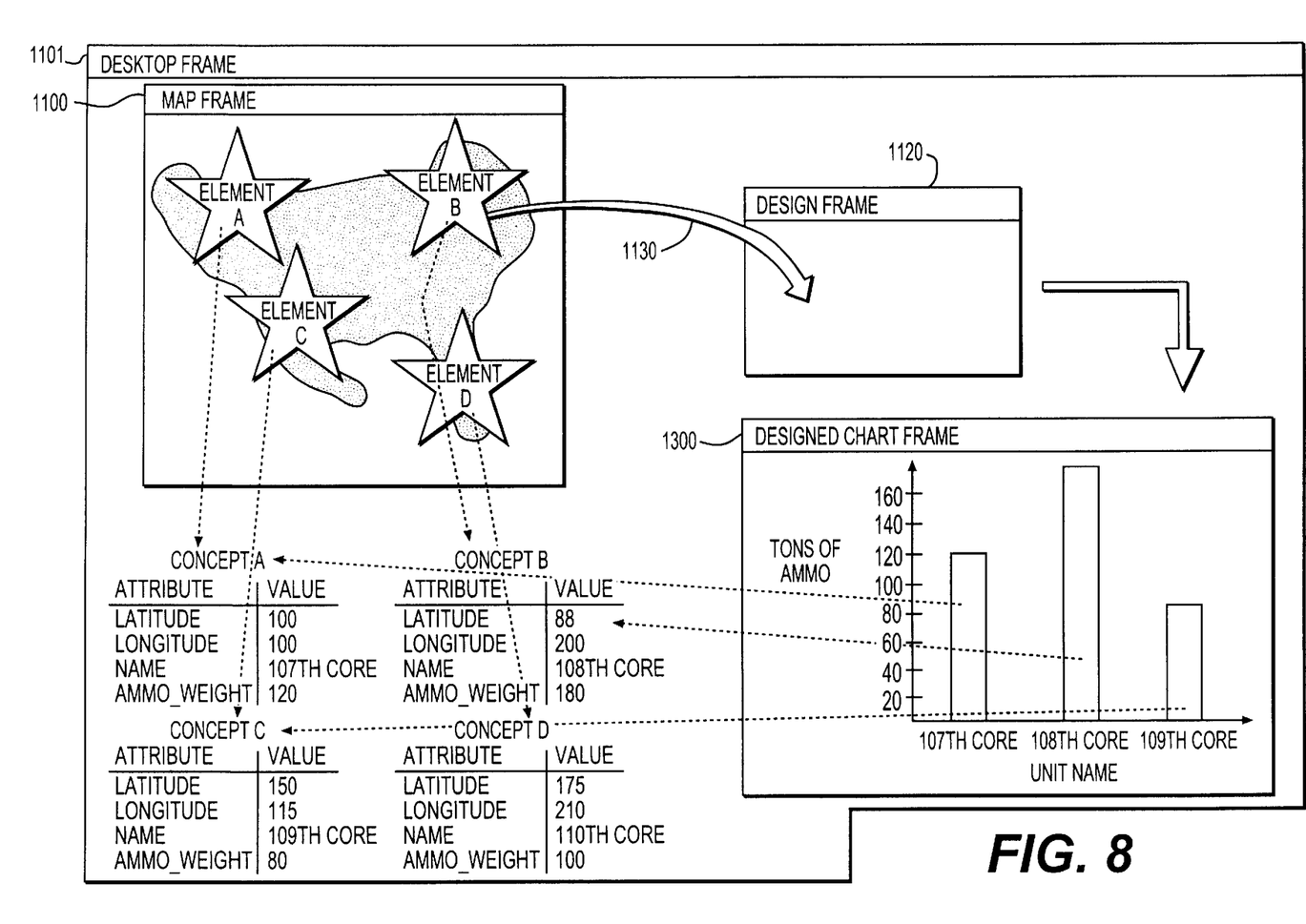
FIG. 8 illustrates a conceptual diagram showing a drag operation and frame design according to the present invention.
Figure 9:
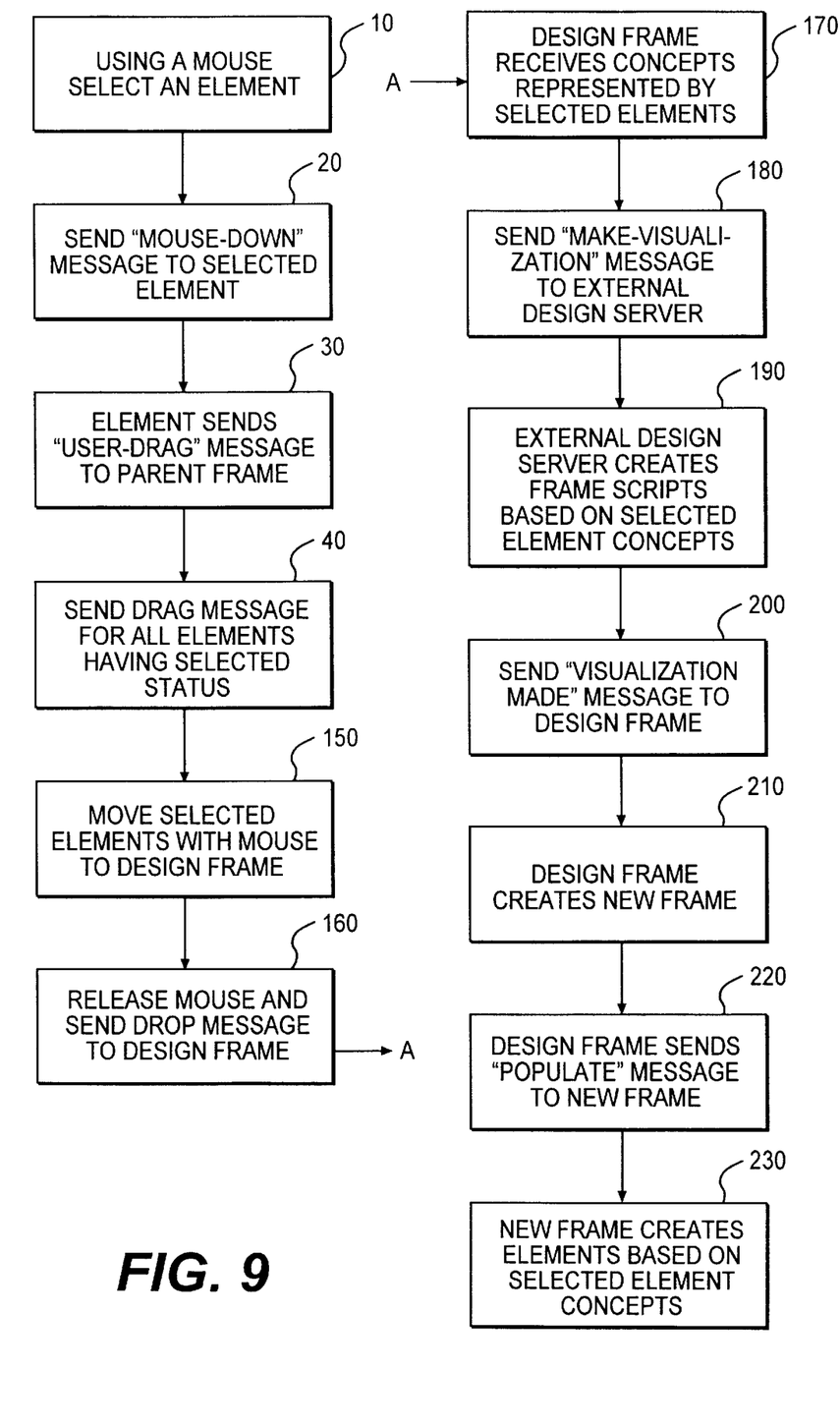
FIG. 9 is a flow chart illustrating the steps shown in FIG. 8.

In the scenario of FIG. 8 and the flow chart in FIG. 9, the user drags elements from the map frame 1100 to a design frame 1120 that contacts an external design server to provide scripts that control the behavior of a new frame. As in the previous scenario, when the user selects element A using the mouse (shown as step 10 of FIG. 9), the system sends a mouse-down message to the element under the mouse cursor (step 20). In response to the mouse-down message, the element sends a user drag message to its desktop frame 1101 expressing the user's interest in dragging it (step 30). In response to the user drag message, the map frame 1100 sends a drag message to its parent with all elements having been selected (step 40). In response to the drag message, the desk top frame moves the elements under the mouse cursor until the user releases the mouse button, shown as 1130 in FIG. 8 and step 150 in FIG. 9. Once the mouse button is released, desk top frame sends a drop message to the design frame 1120 under the mouse cursor with the dropped elements (step 160 in FIG. 9).

In response to the drop message, the design frame 1120 retrieves the concepts that the dropped elements visually represent (step 170). It sends a "make-visualization" message to the external design server with this set of underlying concepts (step 180).

In response to the make-visualization message, the external design server constructs a set of frame scripts that specify how to create and arrange elements for concepts that are dropped into a frame possessing the scripts (step 190). It then sends a "visualization-made" message to design frame 1120 that originally sent the make visualization message (step 200).

In response to the visualization made message, the design frame 1120 creates a new frame (shown as 1300 in FIG. 8) imparted with the argument scripts (step 210). The design frame 1120 then sends the new frame 1300 a "populate" message with the argument concepts (step 220). In response to the populate message, the new frame 1300 creates elements for each element concept in the manner specified by the scripts (step 230). It is important that this new frame is on par with other frames of the present invention in that the user may drag elements into it from other frames or from other frames according to the standard operation of the present invention.

Figure 10:
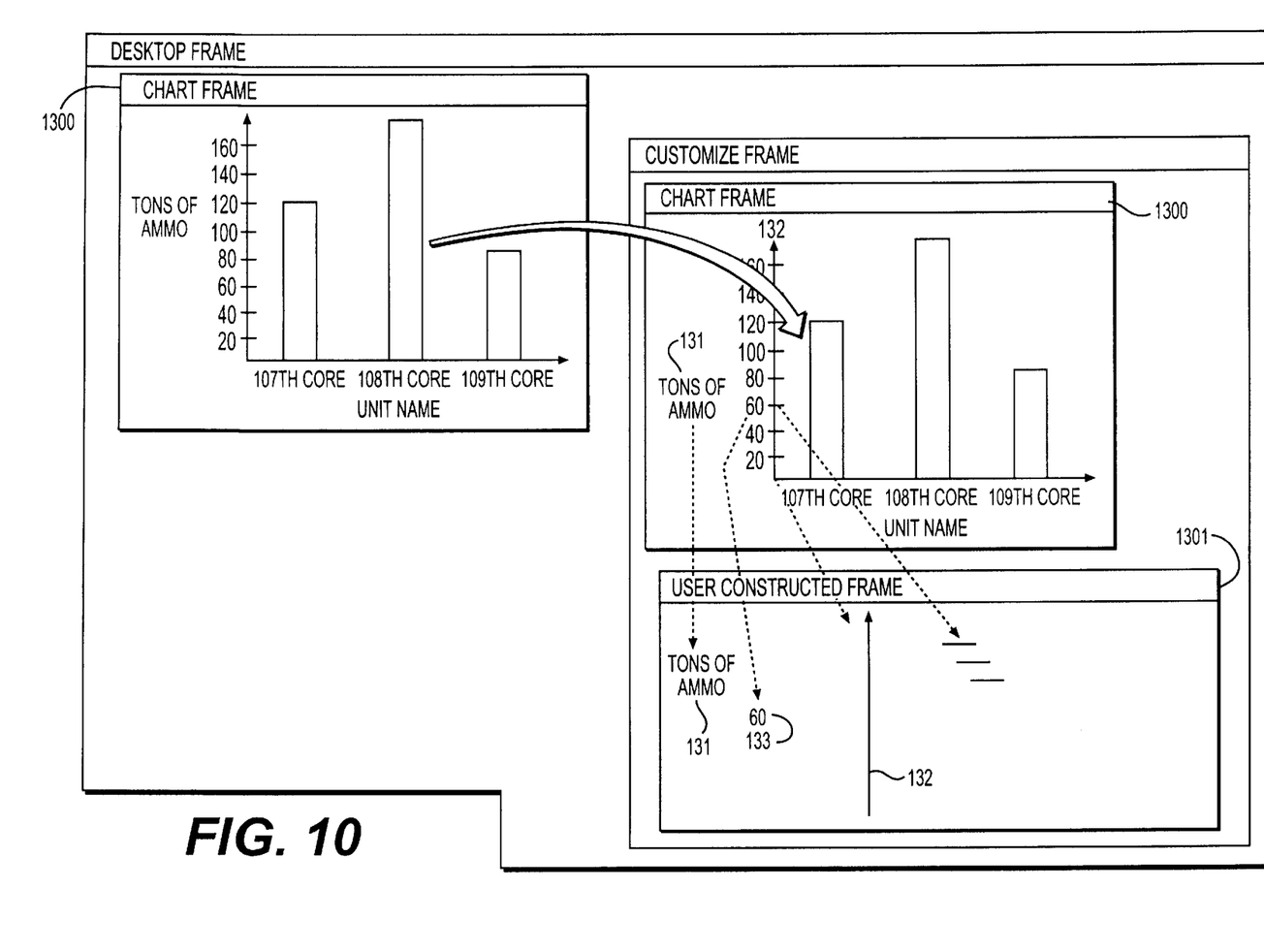
FIG. 10 illustrates a conceptual diagram showing a customizing frame design according to the present invention.

As shown in FIG. 10, when manipulating elements of a frame, the user may desire to use a customized frame. In this manner, the user may directly manipulate all of the elements that comprise the frame's appearance including a label 131, axis 132, and tick mark elements 133. Here, the user has copied several elements from a chart frame 1300 to a customized frame 1301 in order to construct a new frame. In doing such, the user drags elements from a first frame to be customized, which loosens the constraints on the elements in the first frame.

The present invention allows users to flexibly combine information to otherwise isolated interfaces of different applications. The present invention accomplishes this by using an information-centric approach to create new visualizations without great effort or skill.

The present invention provides dynamic visualization generation that allows rapid integrative views of information customized to a user's immediate data tasks. The present invention also provides tools for finding and interactively partitioning, filtering and selectively combining subsets of data in interactive data manipulation; controlling the level of detail to which the information is viewed using drill-down and roll-up techniques; and assembling, laying out and interactively presenting information to others. The present invention further provides a consistent information-centric interface paradigm, thereby reducing complexity and restrictiveness conventionally associated with the mechanics of running and coordinating multiple applications.

The present invention further provides a visualization design server that, given some information pertaining to the construction of a visualization including, but not limited to the data to be graphed and answers to questions proposed to a user, generates a persistent procedural object to create and visually arrange elements that represent data in a novel and useful way. The procedural object is a persistent template that can function in absence of the design server that generated it. Particular variations of this invention include, but are not limited to design servers that can generate procedural objects capable of arranging elements to form graphs, visualizations, calendars, web pages, web sites, and user interfaces.

It will be apparent to those skilled in the art that various modifications and variations can be made in the computer system of the present invention without departing from the spirit or scope of the invention. Thus, it is intended that the present invention cover the modifications and variations of this invention provided they come within the scope of the appended claims and their equivalents.

What is claimed is:

1. A computer assisted method for analyzing information in a plurality of analysis environments, the method comprising the steps of:

receiving the information to be analyzed;

generating data objects, each data object having a plurality of associated attributes;

creating a first visualization frame having a plurality of first elements, by organizing each of the data objects according to at least one of its plurality of attributes, wherein the attributes remain associated with the respective data objects; and creating at least one second visualization frame having a plurality of second elements by manipulating individual first elements of the first visualization frame and organizing the data objects according to a second one of the plurality of attributes, wherein the attributes are persistent and remain associated with the respective data objects, and wherein when at least one of the first elements of the first visualization frame is highlighted, corresponding second elements of the at least second visualization frames are automatically highlighted.

2. The method according to claim 1, wherein any one of the first and at least second visualization frames include a graph, calendars, web pages, bar chart, map, or outliner.

3. The method according to claim 1, wherein the first elements of the first visualization frame can be manipulated by drill-down operations.

4. The method according to claim 1, wherein the first elements of the first visualization frame can be manipulated by roll-up operations.

5. The method according to claim 1, wherein the first elements of the first visualization frame can be manipulated by drag-and-drop operations.

6. The method according to claim 5, wherein the drag-and-drop operations are performed using a mouse.

7. The method according to claim 1, wherein any one of the first and least second visualization frames is constructed dynamically by the computer using predetermined attributes associated with the data objects to be arranged therein.

8. The method according to claim 1, wherein any one of the first and least second visualization frames is constructed dynamically by the computer using selected attributes associated with the data objects to be arranged therein.

9. The method according to claim 1, wherein the associated attributes are dynamically added to data objects.

10. The method according to claim 1, wherein the data objects are generated according to an information-centric organization.

11. A computer system for providing visualized analysis of information in a plurality of analysis environments, the computer system comprising:

means for receiving information to be analyzed;

means for processing the information received; and means for displaying the information in at least one visualization frame, wherein the information is organized into data objects with associated attributes, wherein the data objects are organized and displayed as elements in the at least one visualization frame, each of the data objects and associated attributes being persistent such that the elements can be further manipulated, and wherein when an element of the visualization frame is highlighted, corresponding elements of other visualizations are automatically highlighted.

12. The computer system according to claim 11, wherein the visualization frame includes a graph, calendars, web pages, bar chart, map, or outliner.

13. The computer system according to claim 11, wherein elements of the visualization frame can be manipulated by drill-down operations.

14. The computer system according to claim 11, wherein elements of the visualization frame can be manipulated by roll-up operations.

15. The computer system according to claim 11, wherein elements of the visualization frame can be manipulated by drag-and-drop operations.

16. The computer system according to claim 15, wherein the drag-and-drop operations are performed using a mouse.

17. The computer system according to claim 11, wherein the means for displaying includes means to construct dynamically at least one visualization frame from predetermined attributes associated with the data objects.

18. The computer system according to claim 11, wherein the means for displaying includes means to construct dynamically at least one visualization frame from user selected attributes associated with the data objects.

19. The computer system according to claim 11, wherein the means for displaying includes means to generate data objects according to an information-centric organization.

20. A computer assisted method for analyzing information in a plurality of analysis environments, the method comprising the steps of:

receiving the information to be analyzed;

generating data objects, each data object having a plurality of associated attributes; and creating at least one visualization frame having a plurality of elements by organizing each of the data objects according to at least one of its plurality of attributes, wherein each of the data objects attributes are persistent, wherein the attributes are persistent and remain associated with the respective data objects such that individual elements of the at least one visualization frame can be further manipulated, and wherein when at least one of the elements of the at least one visualization frames is highlighted, corresponding elements of another visualization frame are automatically highlighted.

21. The method according to claim 20, wherein the at least one visualization frame includes a graph, calendars, web pages, bar chart, map, or outliner.

22. The method according to claim 20, wherein the elements of the at least one visualization frame can be manipulated by drill-down operations.

23. The method according to claim 20, wherein the elements of the at least one visualization frame can be manipulated by roll-up operations.

24. The method according to claim 20, wherein the elements of the at least one visualization frame can be manipulated by drag-and-drop operations.

25. The method according to claim 24, wherein the drag-and-drop operations are performed using a mouse.

26. The method according to claim 20, wherein the at least one visualization frame is constructed dynamically by the computer using predetermined attributes associated with the data objects to be arranged therein.

27. The method according to claim 20, wherein the at least one visualization frame is constructed dynamically by the computer using user selected attributes associated with the data objects to be arranged therein.

28. The method according to claim 20, wherein the associated attributes are dynamically added to data objects.

29. The method according to claim 20, wherein the data objects are generated according to an information-centric organization.

* * * * *